United States Patent [19]
Dunn et al.

[11] Patent Number: 5,625,877
[45] Date of Patent: Apr. 29, 1997

[54] WIRELESS VARIABLE BANDWIDTH AIR-LINK SYSTEM

[75] Inventors: James M. Dunn, Ocean Ridge; Edith H. Stern, Boca Raton, both of Fla.

[73] Assignee: International Business Machines Corporation, Armonk, N.Y.

[21] Appl. No.: 404,505

[22] Filed: Mar. 15, 1995

[51] Int. Cl.$^6$ .................................................. H04Q 7/38
[52] U.S. Cl. ................ 455/34.1; 455/54.2; 455/62; 370/329
[58] Field of Search ................... 455/33.1, 34.1, 455/34.2, 54.1, 54.2, 62, 59, 70, 71; 370/95.1, 85.7

[56] References Cited

U.S. PATENT DOCUMENTS

| | | | |
|---|---|---|---|
| 5,351,240 | 9/1994 | Highsmith | 370/84 |
| 5,446,739 | 8/1995 | Nakano et al. | 370/95.3 |
| 5,448,759 | 9/1995 | Krebs et al. | 455/54.1 |
| 5,457,680 | 10/1995 | Kamm et al. | 370/17 |
| 5,479,400 | 12/1995 | Dilworth et al. | 370/60 |
| 5,507,033 | 4/1996 | Dolan | 455/33.1 |
| 5,548,805 | 8/1996 | Shpantzer et al. | 455/33.1 |

*Primary Examiner*—Reinhard J. Eisenzopf
*Assistant Examiner*—Lee Nguyen
*Attorney, Agent, or Firm*—George E. Grosser; Winfield J. Brown, Jr.; John C. Black

[57] ABSTRACT

An apparatus and method for providing variable bandwidth in wireless air-link communication channels which allows a user of an end-user communicating device, e.g. a cellular phone, computer, facsimile, to request the allocation and aggregation of available air-link communication channels for the wireless transmission of messages to and from a mobile end-user communication subscriber unit, e.g. a cellular telephone or portable computer, so as to increase the speed of wireless transmission, wherein information transfer networks, channelized communication radios and microprocessors are typically employed for locating, reserving and aggregating available air-link channels and for transmitting messages between end-user communication devices, one being mobile.

20 Claims, 13 Drawing Sheets

WIRELESS VARIABLE BANDWIDTH AIR-LINK SYSTEM

BACKGROUND OF THE INVENTION

1. Field of the Invention

This invention relates generally to an apparatus and method for providing variable bandwidth in wireless air-link communication and more specifically, to an apparatus and method for allowing a user of a mobile communication radio, e.g. a cellular telephone and portable computer, to be allocated wireless variable bandwidth on demand by aggregating available air-link communication channels.

2. Description of the Background Art

Data or information transmissions commonly occur between desk top or personal computers communicating from different locations, between computers and facsimiles, and between telephones and computers. In any communication, the transmitting device is identified as the "originator" or "originating address," while the receiving device constitutes the "target address." The originating device and target device typically change roles several times in any ongoing communication, but at any given time, one device is the originator and the other is the target.

A simple computer network includes an originator device, at least one information transfer network, a target device, and the cable connections joining the originator, information transfer network, and target. The originating and target devices typically include computers which communicate through modem, servers or local area networks utilizing either a server, modem or both in direct link transmissions. The communicating devices used today also include mobile cellular telephones, portable computers, portable facsimiles, and combinations thereof which communicate over wireless air-link channels. Direct link communicating devices generally transfer information through direct link, i.e. wire or cable connections which typically comprise either commercial telephone lines, copper cables, fiber optic cables, leased lines, or private lines. In a direct link transmission, the information transfer network receives the messages or data from the originator and delivers or routes the communication to the target address. Due to the stable, error free nature of these links, either continuous high speed or lower speed, packetized transfers are allowed. In wireless transmission, messages are broken down into smaller chunks, the size of which is dependent on the intervening network, transmission speed and error correction techniques, and transmitted across an air-link channel of fixed speed to a transceiving station. These chunks of user data are then either encapsulated into packets and sent through a packet network or just sent sequentially through non-packet networks to their target device. More than one information network of packet and non-packet systems, commonly referred to as clouds, may be involved in any communication transmission, depending on the management of the intervening networks, the size of the message and the distance between the originator and ultimate target.

Information transfer networks generally include either a non-packet system, such as public switch telephone network (PSTN) or packet networks. The PSTN, or non-packet network, is the type of network used by telephone carrier companies. PSTNs generally include a plurality of circuit switches which route end-user messages through the phone lines when preselected switches are activated by the dialing of a number. End-user messages in a PSTN are usually segmented and sent in a predetermined sequence for a predetermined length of time, as logged on the communications software and modems employed by the network to their target address or modem. The PSTN periodically stops to re-sync itself and check for errors. Telephone carriers charge the computer user or users for the entire time a PSTN connection is made between communicating devices, regardless of whether information is being conveyed. It is directly analogous to being charged for a long distance phone call. Computers generally communicate in PSTN via dialed-digits and modems, which provide direct links between the computers through the telephone lines. The modem, like a phone, dials the desired phone address of the target computer modem, activating corresponding switches in the PSTN to access the target address. Accordingly, any time a communication link is made between computer modems, the users are charged during the entire time the modems have a communication link.

Packet networks offer an alternative to PSTN communication. Packet networks provide public and private communication network clouds which are command base services that utilize a mesh of packet routers for transmitting packets of data information. A mesh of packet routers usually comprises a typical packet network, whereby the network delivers the packet through a select packet router route. In contrast with PSTN carrier systems, packet communication network servers use packet routers to route and deliver end-user message chunks in packets and customers are generally charged by the number of packets or the number of bits of information per packet being transmitted. A packet router is therefore nothing more than a communication transmission carrier which temporarily stores and forwards a packet of information as it is routed to its target address, or to another packet router for delivering the communication. The message chunks of user data are encapsulated into packets with address headers, error correction bits, synchronization bits, and the like. The packets are routed through packet router networks to their target address. The number of routes used for delivering a message or data string is based on the management of the network cloud, the capacity of the network, and the size of the transmission load. Accordingly, some messages may only go through one router before delivery to the target, while other messages may go through a string of routers before reaching the target destination.

Communication between packet networks or a packet network and target is accomplished through modems and software, albeit different from those used in PSTN. Packet networks use formal address, e.g. "User ID, a computer name, a company name, a network name," which may be in plain text, numeric digit strings, or a mixture thereof, based on the type of networks traversed by the addressed messages.

Local area networks (LAN) are reasonably small and local groups of computers connected by one of a small number of standard methods, such as Ethernet. For instance, the computers may share the network as peers, or a shared resource called a server may be employed to support the computers in the LAN so that they may communicate with other networks such as in Internet. In essence, the server provides a gateway to other networks. The server may also be a print server acting as printer queues or a file server for accessing file libraries. Communication servers may have routing functions built in or may connect to external routing machines when attaching to a network. These external routing machines may be packet routers in the case of a packet data network, or a pool of modems that the end-user computers access and share in the LAN. In the former, the server provides a link between the packet routers and target devices whereby the LAN directly links the communication from the server to the target address based on the user identification code or address of the target terminal. LAN network services either lease telephone lines from telephone line carriers or provide private lines for transmitting packets of communication data.

Typically, computers utilize servers for communicating with packet routers. To initiate a data transmission, the computer, through its user ID, sends a command to the LAN to transmit a communication to a desired target address. The LAN activates its server and then sends a command and data through the server, which links with the desired information transfer network, such as a packet router network. Not all computer terminals however, are necessarily linked through a local area network, that is, they may also communicate directly with a server in preparing data transfers through the packet router system. A packet transfer network accepts the data transmission into a selected packet router which temporarily stores the information in packets and delivers it to the next router, if required, until the data transfer ultimately reaches the servers of the target computer or computers. The target server locates the target address and prepares the target terminal or the target LAN for receiving and routing the data transfer to the target terminal.

The size of the data information and communication channels dictates the speed of transmission. For instance, small messages in the low kilobyte range may only take minutes to transmit, while a megabyte message, such as a large spreadsheet or video, could take hours, depending on the computers and information transfer network being employed. Consequently, in a typical low speed PSTN system which charges customers by the duration of time a communication link is sustained, large messages are relatively expensive to transmit. Although communication networks utilizing packet routers are less expensive because they charge by the packet rather than strictly for on-line time, these systems may also become expensive when transmitting large messages at fixed speeds.

Devices which are directly linked and which communicate through packet routers and servers, and in some cases through PSTN switched circuits, are able to use channelized transmission equipment to vary the bandwidth of transmission in wire or direct links to increase the speed of transmissions. Channelized equipment increases the size of the communication bandwidth so that large messages may be more conveniently and quickly transmitted between locations. Conventional channelized equipment searches the transmission lines for available channels and aggregates these channels together so that a larger overall bandwidth is obtained. Before a transmission, the originating computer sends a command through the packet router, demanding an aggregation of channels for increased bandwidth. The channelized equipment locates and aggregates the available channels by dedicating the requested bandwidth from the total bandwidth available on that particular transmission path.

The problem, however, is that the aggregation of communication channels is not available for wireless air-link protocols which transmit information across bandwidth channels in the airways. That is, conventional wireless communication systems are not able to aggregate air-link available channels to increase the overall bandwidth of air-link communication channels like computer systems communicating directly through cable or telephone lines. Instead, wireless communication is limited to transmission at fixed speeds, i.e. through a single channel, because variable bandwidth is not available. Although a plurality of channels exists at any given time for transferring communication data across wireless links, each of these channels has a fixed bandwidth. But, even though channel aggregation has been done for wired links, the same is not true for wireless communication. Remote subscriber communication devices today are not able to allocate variable air-link bandwidth on demand to increase the overall bandwidth of available air-link channels for wireless or air-link transmissions. While the computer sending information across a direct cable link can command larger bandwidth and vary that bandwidth according to its demand, remote devices such as mobile cellular phones, portable computers, or portable facsimile machines are limited to single channel transmission. That is, remote communication devices initially transmit data across a wireless highway in a fixed bandwidth channel to a transceiving station, and are unable to demand increased bandwidth or the aggregation of available channels to increase the overall bandwidth or speed of wireless data transmissions. Thus, the ability to aggregate direct link channels is of no benefit in wireless communication whereby the transmission of messages is slowed in the air-links because of the inability to increase bandwidth.

Consequently, the existing wireless air-link protocols only allow data transmission at fixed speeds, typically one speed for any given network. In some cases, this is due to the frequency of a channel and the guardband separations of existing radio channels, but in most cases, it is due to the inability to easily request more bandwidth capacity with additional channels, and to aggregate the existing channels into a higher bandwidth channel. As a result, the transfer of messages having a relatively large amount of data is limited to a single channel of fixed bandwidth so that it takes much longer to transmit over air-links than through conventional systems communicating across wired links. Thus, the relevant link requiring increased bandwidth and channel aggregation is the wireless air-link between remote or mobile communication devices and transceiver stations. This is because once a communication reaches a local receiving point, it may be transferred across aggregated channels in cables such as telephone lines. Accordingly, there exists a need for an apparatus or method that aggregates wireless air-link channels for increasing the overall bandwidth of wireless communication transmissions so that the full capacity of end-user communication systems may be capitalized.

Several devices are contemplated in the background art which assign channels, provide alternate routing of channels, use guardbands to carry data, optimize channel use in a given location, utilize channel hopping between quiet spots in channels, and assign channels for radio communication transmission. However, none of these devices solve or address the above-noted problems or provide systems which search, locate and aggregate available channels in wireless air-link communication zones for increasing the speed and efficiency in the transmission of information across wireless or radio channels. For instance, Ash et al., U.S. Pat. No. 5,130,982, teaches a communication network for allocating bandwidth comprising a plurality of interconnected nodes having a subdivided bandwidth for sharing the network bandwidth among the network nodes. The network uses a shared pool of bandwidth commonly connected to the nodes which establishes direct wired links or paths between the nodes for handling information of transmission traffic. Ash et al. establishes direct links between network nodes but does not allocate and aggregate available radio channels for varying or increasing bandwidths across wireless links.

Hasegawa, et al U.S. Pat. No. 5,065,399 discloses a method for restoring a telecommunication path between network nodes after an interrupting network direct link failure. Hasegawa teaches an automatic network restoration method which is adapted to restore direct link communication between nodes when the default communication link terminates because of a failed link. Hasegawa searches for the link with the highest spare bandwidth based on the bandwidth lost in the failed communication link and chooses the direct links between nodes having the highest bandwidth capacity for replacing the path lost. Hasegawa, however, does not focus on the end-user and does not search for and aggregate available air-link channels on demand to increase or vary bandwidth in wireless communication.

In U.S. Pat. No. 4,280,630, Wang discloses a method for assigning individual channels based on last usage and last quality. Wang teaches a base station and a radio communication system comprising a channel allocator that allocates communication channels from a preferred channel list. The channels are allocated in accordance with a mean margin value with respect to a predetermined threshold channel quality. Wang does not teach a dynamic bandwidth air-link allocation system for improving the efficiency of wireless information transfer from transmission. Rather, Wang allocates single channels for direct link communication.

Ito et al., U.S. Pat. No. 5,210,752, discloses a radio telecommunication system for using fixed bandwidth channels that would normally be voice channels to carry network control signals in a way that insures rapid call setup and start timing in congested areas. Ito et al. teaches a radio telecommunication system for determining whether a central radio frequency can be used by locating free time slots in a channel having a plurality of speech radio slots. Ito et al. tries to respond to an increase in central traffic without preparing a large number of controlled radio frequencies. Ito et al. determines which radio frequency can be used, determines if each time slot on the plurality of speech radios is free and selects a radio channel based on the free time slots.

George, U.S. Pat. No. 5,214,789, teaches a method of optimizing radio channel utilization when the location of a mobile radio is known. A channel is assigned to a mobile radio based on the location of the mobile radio to optimize communication channel allocation in given zones. George does not aggregate channels on demand for maximizing transmission efficiency with increased bandwidth allocation. Rather, George concentrates on the location of mobile users to optimize the allocation of channels in particular zones.

Finally, Bronder, et al. U.S. Pat. No. 5,005,169, teaches a frequency division multiplier guardband communication system that uses low powered signals in existing guardbands to carry data. The signals pretend to be noise by staying below a specified power level so that interference with the recovery of the main frequency division multiplier does not occur.

The above-noted references do not provide an apparatus or method for wireless variable bandwidth communication across air-link channels at the demand of the end-users. Variable bandwidth for wireless communication in the radio air-links is important for increasing the efficiency and speed of communication data transmissions which conventionally has been limited to fixed speeds because transmission has only been possible across a single air-link channel. Consequently, there exists a need for a device and method for varying the bandwidth of air-link channels used in wireless communication for improving the efficiency and speed of information transmission. The present invention provides such a system and method which searches, locates, and aggregates available air-link channels for increasing the overall bandwidth of the wireless communication link, which in turn increases the speed and efficiency of transmission.

SUMMARY OF THE INVENTION

It is an object of the present invention to provide an apparatus and method that increases the speed and efficiency of wireless communication between end-user devices, wherein the end-users may demand "increased bandwidth" for air-link transmission. It is also an object of the present invention to provide an apparatus and method that allows end-users in communication systems to demand the aggregation of available air-link or radio channels for increasing the speed of wireless transmission.

It is another object of the present invention to provide wireless variable bandwidth air-links by allowing end-user devices, such as mobile phones or portable computers, to demand the transmission of information across air-link channels at variable speeds for sending larger amounts of information more quickly to and from remote mobile target devices.

It is yet another object of the present invention to provide a system which allows an end-user of a mobile device, such as a mobile phone or portable computer, to increase the bandwidth of available radio channels on demand for transmitting messages and information faster across air-link channels.

It is still a further object of the present invention to provide a method for aggregating available radio channels to increase the overall bandwidth of air-link channels across which a message is transmitted between a remote device and transceiver so that larger messages may be transmitted faster.

In accordance with these and other objects, the present invention comprises a system and method for increasing the bandwidth or speed of data transmission across wireless air-link protocols by aggregating available communication channels in the airway. The wireless variable bandwidth air-link system solves the problems noted in the background art by providing a subscriber remote unit, a transceiver station, a master microprocessor, a software package, and a channelized radio with a method that allows a remote subscriber end-user device, of any end-user device communicating with a mobile end-user unit, to demand the aggregation of available radio or air-link channels. Messages are more quickly transmitted and received by increasing the bandwidth of available air-link channels. The instant invention generally comprises the master microprocessor and software package but may also include a conventional channel radio and wireless subscriber remote unit (SRU), such as a cellular telephone, portable computer or mobile facsimile, having a corresponding microprocessor card, transceiver, and modem for communicating with the master microprocessor. The SRU typically includes a transceiver for transmitting and receiving messages to and from the transceiver station, respectively, and a modem for establishing a communication link with the other end user. The present invention may employ any type of conventional channel radio capable of locating and aggregating available radio channels for the transmission of messages from a transceiver tower.

The present invention provides a system that permits an end-user device, either a SRU or terminal end-user device to aggregate available air-link radio channels on demand to increase the overall bandwidth from the total bandwidth available so that large messages, may be more efficiently transmitted from or to a subscriber remote unit, i.e. a mobile end-user device. A method is also provided by the system for aggregating available air-link channels for faster communication between the subscriber remote unit device and the transceiver station. The method generally includes an SRU originating end-user device demanding the aggregation of available air-link channels for transmitting a message between the SRU and transceiver, sending the demand to the master microprocessor, initiating and triggering the channelized radio to search, locate and reserve available airway channels at the demand of the microprocessor, aggregating the available channels, sending a confirmation from the master microprocessor to the originating device and transmitting the message from the originator over the aggregated channels.

If the SRU is the originating device it transmits a demand for air-link channel aggregation to the master microprocessor, via the transceiver tower. After the SRU receives a confirmation from the master microprocessor that air-link channels have been aggregated, it prepares and transmits its message to the transceiver device. The transceiver device sends that message directly through the channel radio to the external information transfer network, i.e. packet router network or PSTN, which routes it to the target address as dictated by the originator. On the other hand, if the terminal device is the originator, it sends the request for aggregation to the master microprocessor through the packet router network then prepares its message and transmits the message to the external transfer network, which sends it to the radio and then to the transceiver which ultimately transmits the message over the aggregated air-link channels to the SRU. This invention represents a novel approach to wireless communication, wherein the existing wireless air-link protocols known only allow data transmission at fixed speeds. With the present invention, however, data transmission may be accomplished between wireless protocols across air-links at increased speeds or bandwidth.

In the preferred embodiment, the wireless variable bandwidth air-link system comprises a master microprocessor having supporting software, a channelized radio and a transceiver. The wireless variable bandwidth air-link system allows a mobile end-user communicating device to transmit and receive messages over aggregated air-link or radio channels. By aggregating air-link channels the overall bandwidth of the transmission medium is increased. The mobile end-user device, or SRU, may be a cellular telephone, portable computer or portable facsimile, while the fixed end-user device is typically a terminal device comprising either a desk top computer, facsimile, or a copy machine with a microprocessor. Communications between the transceiver station and fixed terminal device occur over direct, wired links and are transferred through an information transfer network, such as a packet router network or PSTN. In any communication sequence, one end-user device comprises the target address while the other end-user device comprises the originating address. For purposes of explanation, the SRU is sometimes discussed as the originating address while the terminal device is referenced as the target address, however it should be noted that the roles may be reversed so that during any given communication either device may transmit or receive a message.

Preferably, the SRU comprises a mobile communication cellular device having a microprocessor, transceiver and modem, such as a cellular phone with programming capabilities or a lap top computer with a cellular phone adapter modem and transceiver. The SRU communicates with either fixed terminal devices or other SRU's through an external transceiver station by transmitting and receiving messages over the air-link or radio channels. Wireless transmissions have always been over single channels of fixed bandwidth, but the present invention allows the end-user device to demand the joining of free air-link channels, e.g. radio channels, so that an overall increase in bandwidth is achieved. The transceiver station sends received messages from an SRU to the target address by routing the message through the channelized radio, to the external transfer network, i.e. either a packet or non-packet network, to either a server, modem or both and then finally to the terminal target address. If the terminal is the originating device it initiates the aggregation by sending the demand through a packet router to the master processor which activates the channelized radio to locate, reserve and aggregate available channels. Subsequently, the terminal sends the desired message through either its modem, server, or both, to an external transfer network, then to the channel radio and transceiver which transmits the message to the SRU over the aggregated air-link channels. In either case, all transmission between the transceiver station and terminal end-user device are through direct or wired links.

As noted, either the SRU or terminal may demand the master microprocessor to aggregate a number of available radio channels in the air-link before transmitting the message to the transceiving device so that a faster transmission may be accomplished over the air-links. The master microprocessor receives information from the originator on the size of the message to be transmitted so that it may initiate and command the channelized radio to search, locate and allocate available radio channels for aggregation. The channelized radio upon initialization searches and locates available air-link channels which may be aggregated, sends that information to the master microprocessor. The master microprocessor decides which channels to allocate and aggregate and sends the confirming command to the channelized radio to aggregate selected channels. As discussed in the background art, the existing transmission equipment aggregates direct link cable channels for routing the message between the target terminal device and transceiver more efficiently. With the present invention, the aggregation of radio or air-link channels is accomplished at the demand of either the SRU or terminal device depending which device is transmitting a message.

In accordance with the preferred embodiment, two different options exist at the end-user device. Using existing industry technology, the end-user has the option of receiving or transmitting messages across a single air-link channel, typically having a fixed bandwidth, or aggregated air-link channels. The end-user sends the request to the master microprocessor. If the request is for a single air-link channel transmission, the master microprocessor demands the channel radio to prepare an air-link channel for transmitting the message. When the originating end-user is a SRU, the message is received at the transceiver and send through the path as previously noted. On the other hand, if the request is a demand for the aggregation of air-link channels, the master microprocessor initializes the channel radio to locate, reserve and aggregate the available air-link channels. In one embodiment, the end-user before selecting an aggregated channel transmission has the option of computing an estimated transmission time duration based on the available air-link channels. When computing an estimated duration of transmission, the channel radio locates and reserves channels and reports the bandwidths of those channels to the master microprocessor. The master microprocessor then computes an estimated transmission time based on these bandwidths and sends the time and a confirmation to the requesting end-user. In any event, once the channels have been aggregated, the message is transmitted from either the SRU or transceiver station, depending on which is the originating end-user and over the aggregated air-link channels. Since a message is normally transmitted in chunks, either the channel radio or target SRU must reassemble the segments of a message transmitted across the aggregated air-link channels into its correct form for processing by the target. The radio typically reassembles messages received from an SRU for transmission over the direct links to the target address. Alternatively, if all of the available channels being aggregated are adjacent radio frequencies, the aggregated channels may be treated as one large block of frequency bandwidth. By doing this, the wireless bandwidth air-link is increased and a message is transmitted without being disassembled for transmission across the aggregated channels. Aggregating adjacent radio channels in the overall frequency spectrum also decreases the interference which could occur in an aggregated channel transmission. Thus, the channelized radio looks for adjacent channels before aggregating.

A more detailed method for aggregating available air-link or radio channels for wireless air-link message transmission comprises the steps of sending a request message to a master microprocessor demanding the aggregation of available channels, sending a command from the master microprocessor to the channelized radio to aggregate channels, the channelized radio then locating and reserving available air-link channels, the microprocessor sending a confirming message to the SRU that available channels exist for aggregation, the sending of a confirmed authorization from the subscriber remote unit to the master microprocessor to aggregate the available channels, the sending of confirming response to the channel radio to aggregate the reserved air-link channels and then finally the aggregation of the available air-link channels by the channel radio.

Accordingly, the master microprocessor performs the brain work of initializing, preparing and commanding the channelized radio to aggregate available air-link channels. Once the available air-link channels have been aggregated, the SRU receives a confirming response from the master microprocessor to transmit the message. The SRU then transmits its message to the transceiving device, which is then routed through the channel radio to the external transfer network. The channel radio prepares the external transfer network, such as a packet router, for receiving and transmitting the message to the server which then routes the information or message to the target terminal address.

The present invention may be used with any type of data transmission networks which communicate through conventional channelized radios capable of locating and aggregating available channels. However, the instant invention is described with preference for cellular digital packeting or packet routers because packet routers are more efficient and cost effective since they route packets of information instead of sending messages through switching networks. In accordance with these and other objects which will become apparent hereinafter, the instant invention will now be described with particular reference to the accompanying drawings.

DESCRIPTION OF THE PREFERRED EMBODIMENTS

Figure 1:
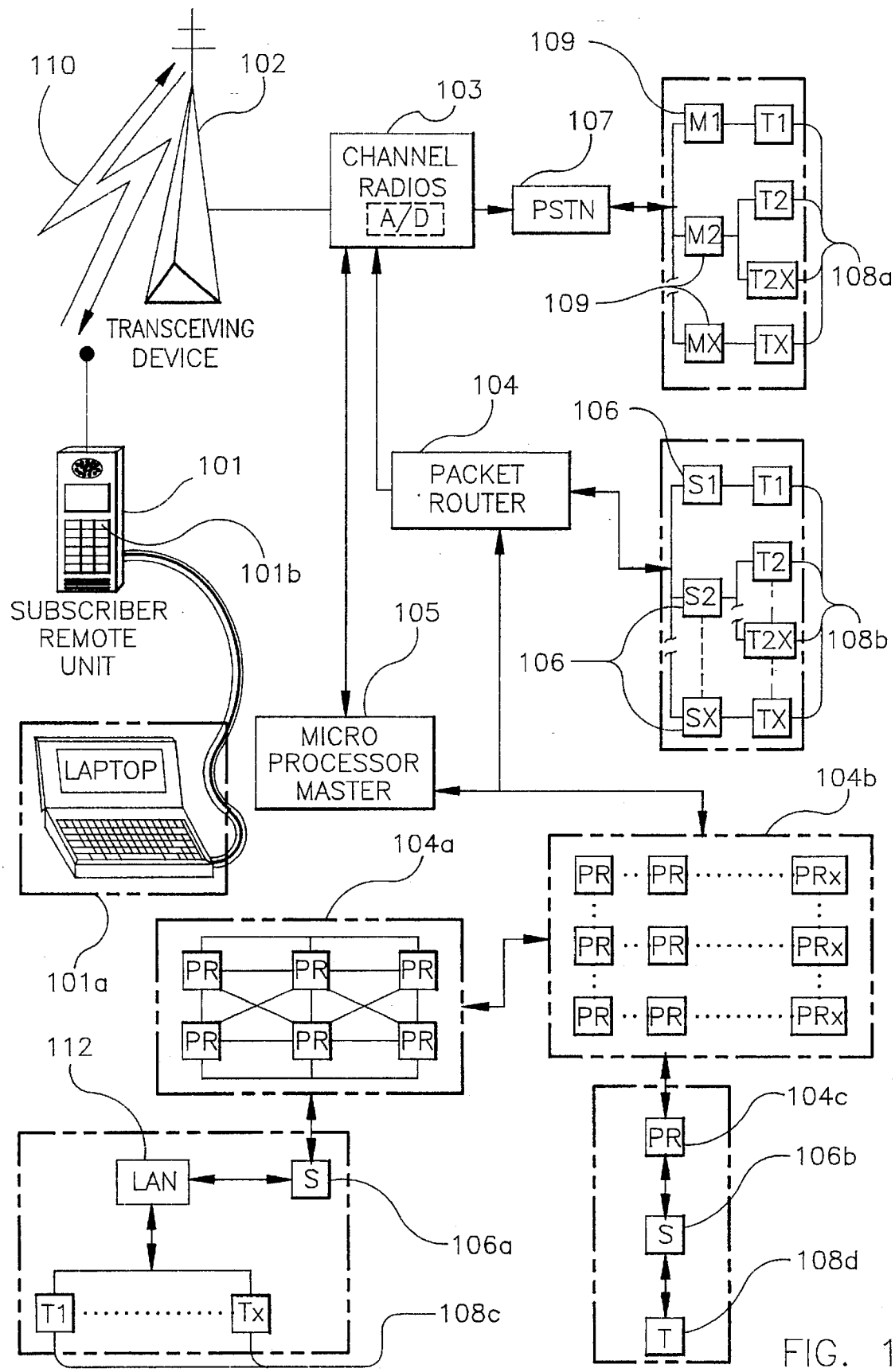
FIG. 1 shows a schematic block diagram of the wireless variable bandwidth air-link system in a typical communication network with optional components outlined in phantom.

With reference to the drawings, FIGS. 1–5 depict a wireless variable bandwidth air-link communication network and method for aggregating air-link channels. The network 100 comprises a subscriber remote unit (SRU) 101, a transceiving station 102, a channelized radio 103, a packet router 104, and a master microprocessor 105. The present invention incorporates a master microprocessor 105 having software which performs steps as outlined in the flow charts in FIGS. 2a, 4d, and for communicating with the channel radio 103 and the packet router network 104–104c to aggregate air-link bandwidth for the wireless transmission of data communication messages between end-user device, one of which is a mobile SRU 101. A request to locate, allocate and aggregate available air-link channels for increased bandwidth is typically sent through a packet router 104, 104a, 104b or 104c which establishes the compatible communication link with the processor 105 enabling it to initialize the radio 103. When an SRU 101 is the originating device a message is sent to the ultimate target terminal device 108, such as a desk top computer, facsimile or other communication device, represented by T1-TX in the drawings, through an external transfer network which can include either a packet router 104 or a PSTN 107.

As aforementioned, the speed at which a communication is sent from an originating device to a target device depends upon the bandwidth of the radio or air-link channel through which the communication is being sent. The present invention increases the speed of transmission for large communications, or messages, by aggregating available air-link channels, referenced by 110, so as to provide a wider or greater overall bandwidth. The greater the bandwidth the faster the communication and the greater the capacity for transmitting larger messages more efficiently. It is important to note that while aggregating communication channels in direct wire links has been accomplished in the past, the same has not been true for wireless air-link transmissions from mobile devices.

Figure 5:
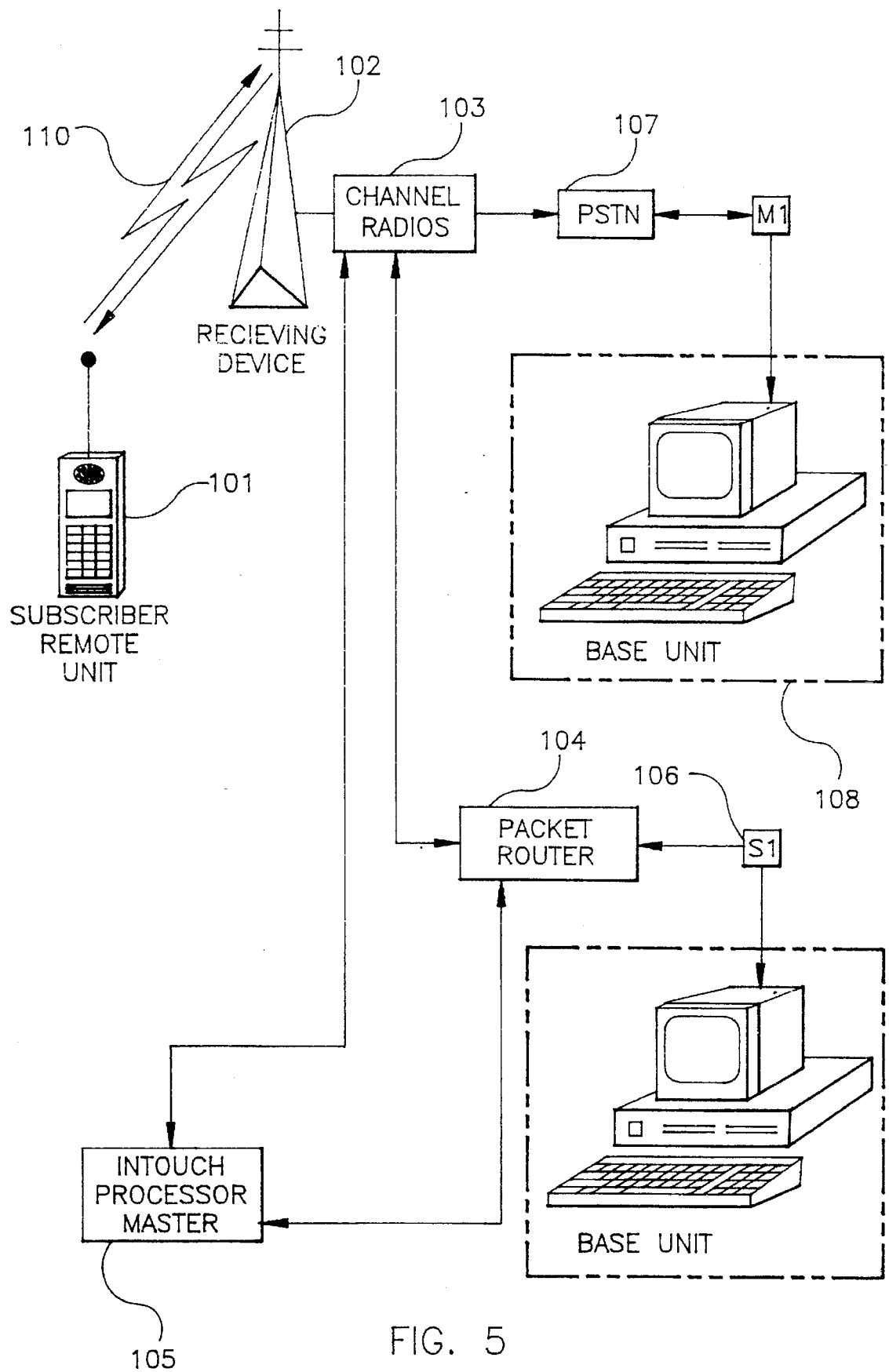
FIG. 5 is a simplified schematic diagram of the wireless variable bandwidth air-link system in a typical communication network.

With reference to FIGS. 1 and 5, the preferred embodiment of the wireless variable bandwidth air-link system merely comprise a master microprocessor 105 and a software package with any of the steps shown in FIGS. 2c–4d. The invention may also include a conventional channelized radio 103, or wireless radio transmitting means, capable of locating and aggregating air-link channels and a transceiving device 102 for communicating with a SRU. The system network 100 of the instant invention includes the master micro-processor with software, a packet router network 104, a channelized radio 103, a transceiver device 102 and a subscriber remote unit 101. The processor 105 and software controls the aggregation of available air-link channels for increasing the overall bandwidth of wireless or air-link transmissions and it works in conjunction with the packet router 104, radio 103 and a transceiver 102. The aggregation of available air-link channels 110 may be performed by the master microprocessor 105, any channelized radio equipment 103 capable of locating and combining air-link channels, and a transceiver device 102. Once the air-link channels 110 are aggregated, an increased or variable bandwidth is available for wireless communication between end-user communicating device. The end-user devices may both be SRUs 101 or an SRU 101 and fixed direct wired communication terminal device 108–108d, such as a personal computer or facsimile.

In the preferred embodiment, the SRU 101 may comprise either a cellular telephone having a microprocessor and modem, a portable computer with a modem 101a, phone adaptor, and transceiver such as the IBM Think Pad, portable facsimile or any device with wireless communication capabilities. That is, the SRU 101 may be any wireless communicating device having a transceiver, microprocessor and modem type device. The SRU 101 communicates across the air-links 110 with a transceiver station 102 that receives and transmits messages between the end-users. The transceiver station 102 is directly linked to the channelized radio 103 which is directly linked to the external information transfer network, 104 or 107, and a master microprocessor 105. Preferably, the external information transfer network includes a packet router network 104 since the originator communicates through a packet router 104 to request the aggregated bandwidth. Subsequently, the originator can use either the packet network 104–104c or the PSTN switch network 107 to communicate with the target. Thus, the master microprocessor 105 and packet router 104 are directly linked so that the end-user device 108 or 101 may request the aggregation of air-link channels 110 and the processor 105 can initialize the radio 103. The channel radio 103 is typically linked to a PSTN switching circuit 107, a packet router or both for directing messages to the end-user devices connected to the particular external transfer network. The present invention is software driven by the master processor 105 which receives the command inputs from the end-user device, either 101 or 108, albeit via the transceiver station 102 and radio 103, to control the channel radio 103 in finding and aggregating available air-link channels.

The packet router 104 may be directly linked to the terminal device 108a–d through an external network and server, such as an ethernet or internet. The server 106 routes messages between a select terminal 108a–d and the packet router 104–104c wherein the server 106 communicates with a user ID identifying the terminal which is receiving or sending a message. The packet router network 104 may be directly linked to other packet routers 104a, 104b or 104c thereby communicating with a number of packet router systems before ever reaching the ultimate server 106a or 106b and terminal T as shown in FIG. 1. The number of packet routers through which a message must be sent typically depends on the location and distance a communication must travel before reaching its destination, such as in overseas communication.

When the SRU 101 initiates a wireless transmission, it sends a command input through a fixed air-link channel to the transceiver tower 102 and the channel radio 103 for receipt by the master microprocessor 105. The processor 105 causes the channel radio 103 to search and aggregate air-link channels. Afterwards, the processor 105 confirms the aggregation of channels to the SRU 101. The transceiver device 102 receives the message and sends that message to either the packet router network 104 or the switched circuit (PSTN) network 107, as directed by the originator. Using existing network rules, the message is addressed and routed to the target address. The message may be sent to one or more terminal target addresses depending on the SRU 101 command. A message is typically transmitted in chunks and reassembled by the radio 103, having a signal processor for modulating or demodulating, if the SRU is the originator. Messages are sent in an analog to analog (A/A) transmission and converted to digital by an A/D loading to digital converter somewhere in the direct links. The A/D may be located on the tower 102, radio 103, processor 105, or external network or somewhere there between. Likewise, the reassembly of the message may be at any point.

If a request from the SRU 101 or the end-user terminal 108 is a request for a dynamic wide band allocation of the radio or air-link channels, the master microprocessor 105 converts this to the appropriate request and sends it to the channel radio or radios 103. Thus, the master microprocessor 105 receives the request for an aggregation of channels from the SRU 101 or the device depending on which end-user is transmitting a message. This triggers the master microprocessor 105 to convert the request into a command for a larger bandwidth to the channel radio 103. Upon receiving the command from the master microprocessor 105, the radio searches, locates and aggregates available radio channels. Thus, the channel radio 103 calculates which channels are idle, reserves these channels and sends a reply back to the master microprocessor 105 which determines the channel identification of those reserved. The master microprocessor 105 transfers this information to the SRU 101 through the message link established by the packet router network and the channel radio and the channels originally assigned for the communication between the packet router 104 and channel radio 103. The SRU 101 or terminal device 108, depending on which is identified as the originating device, confirms the demand for the aggregation of channels. The master microprocessor 105 upon receiving the confirmation, authorizes the channelized radio to aggregate the radio or air-link channels reserved.

In FIG. 1, the present invention is shown in use with an overall system establishing links between multiple end-user terminals, packet routers and servers. In FIG. 5, a simple system is shown wherein the terminal T1 could be a desk top computer as shown. The terminals T1–TX, however, represented by reference characters 108a–d may be any communication device which communicates through a modem, server, or both. The SRU 101 is a mobile communication device which may comprise a microprocessor and transceiver installed in a conventional cellular phone or portable computer. In FIG. 1, a SRU 101 is shown as a wireless communication device such as a cellular phone which transmits information to a receiving device 102. The SRU 101 may be electrically attachable to a portable computer.

Figure 2A:
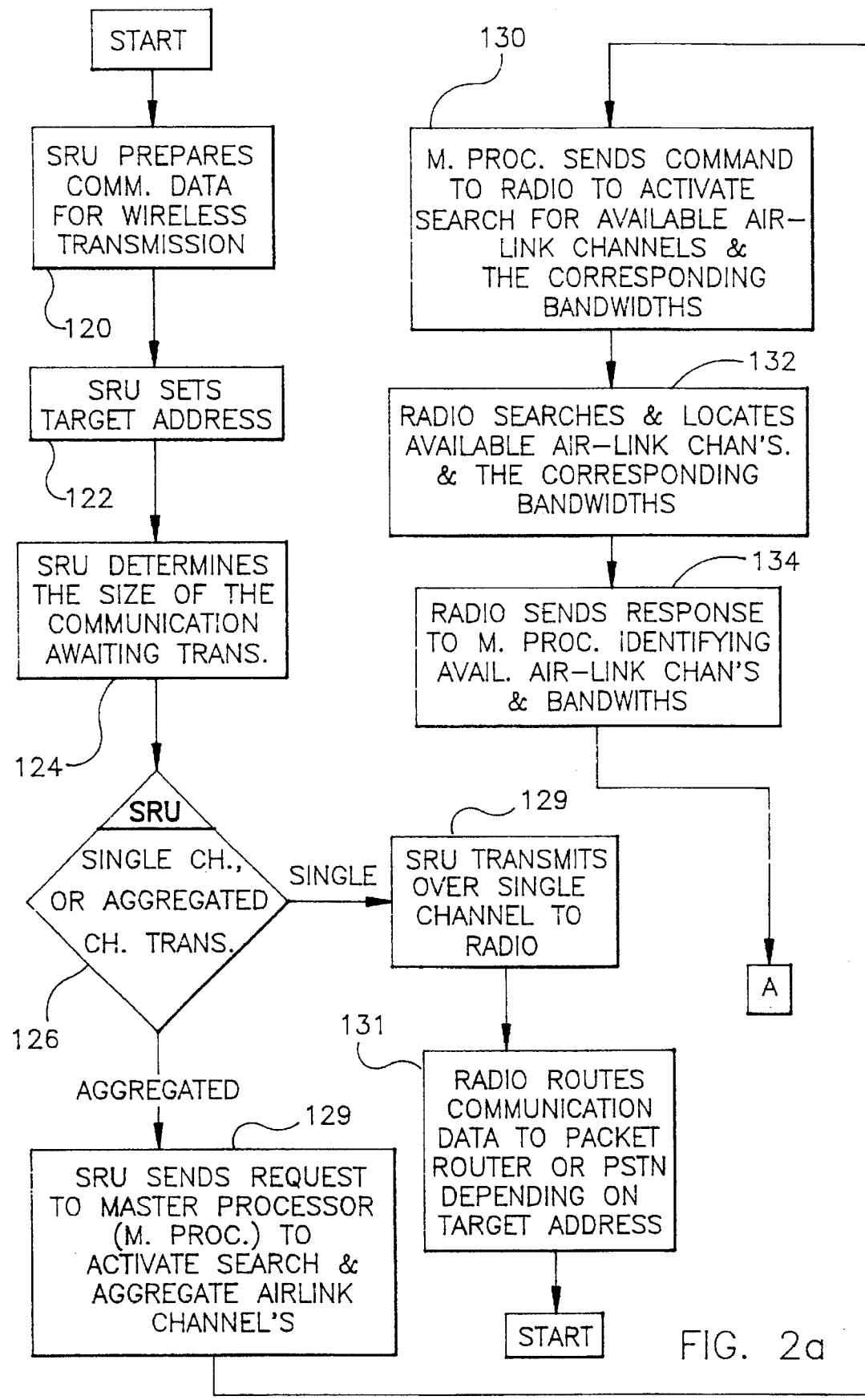
FIGS. 2a–2c are flow diagrams illustrating the operation of the SRU, transceiver, channel radio and master microprocessor according to one embodiment of the instant invention.
Figure 2B:
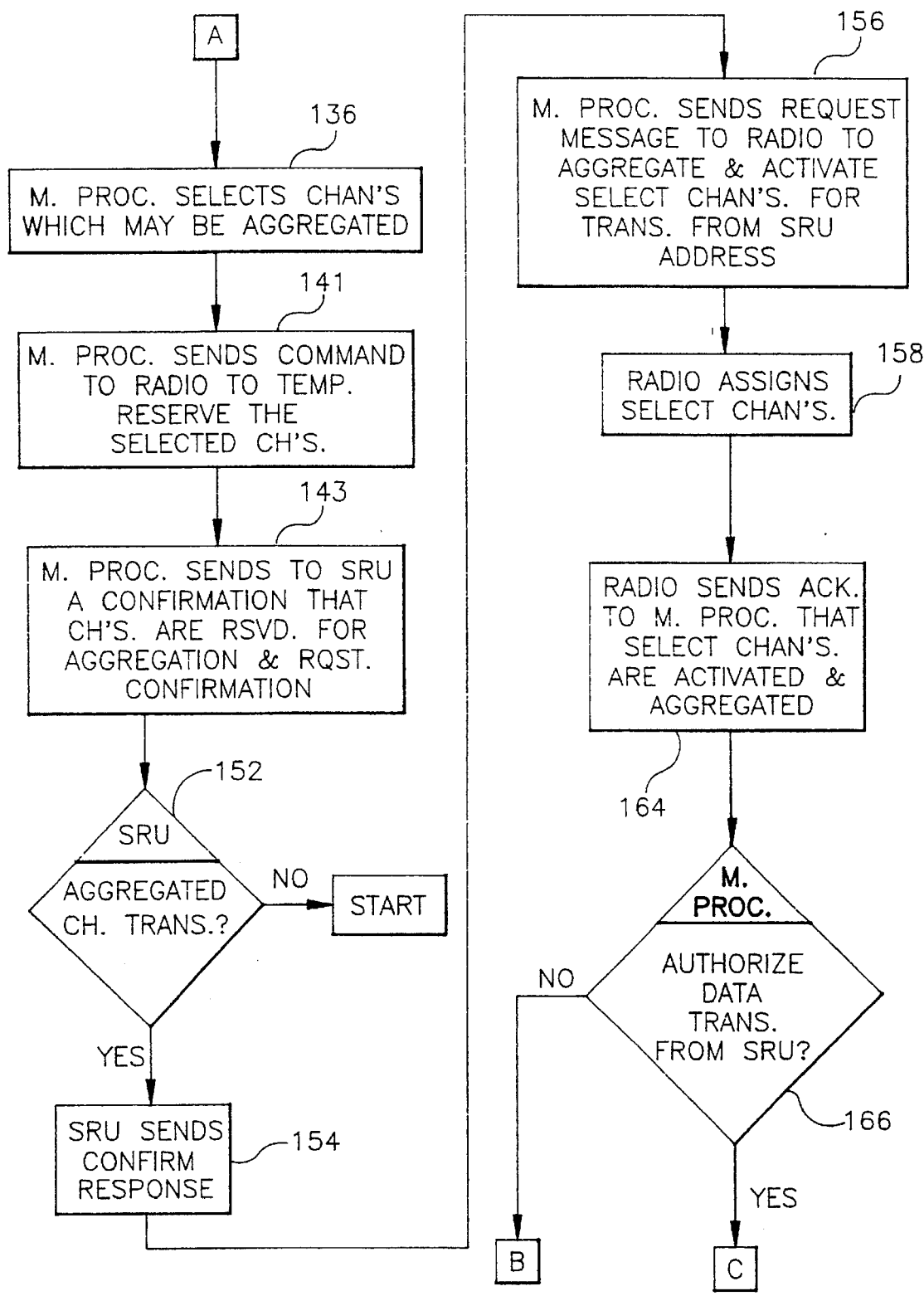
Figure 2C:
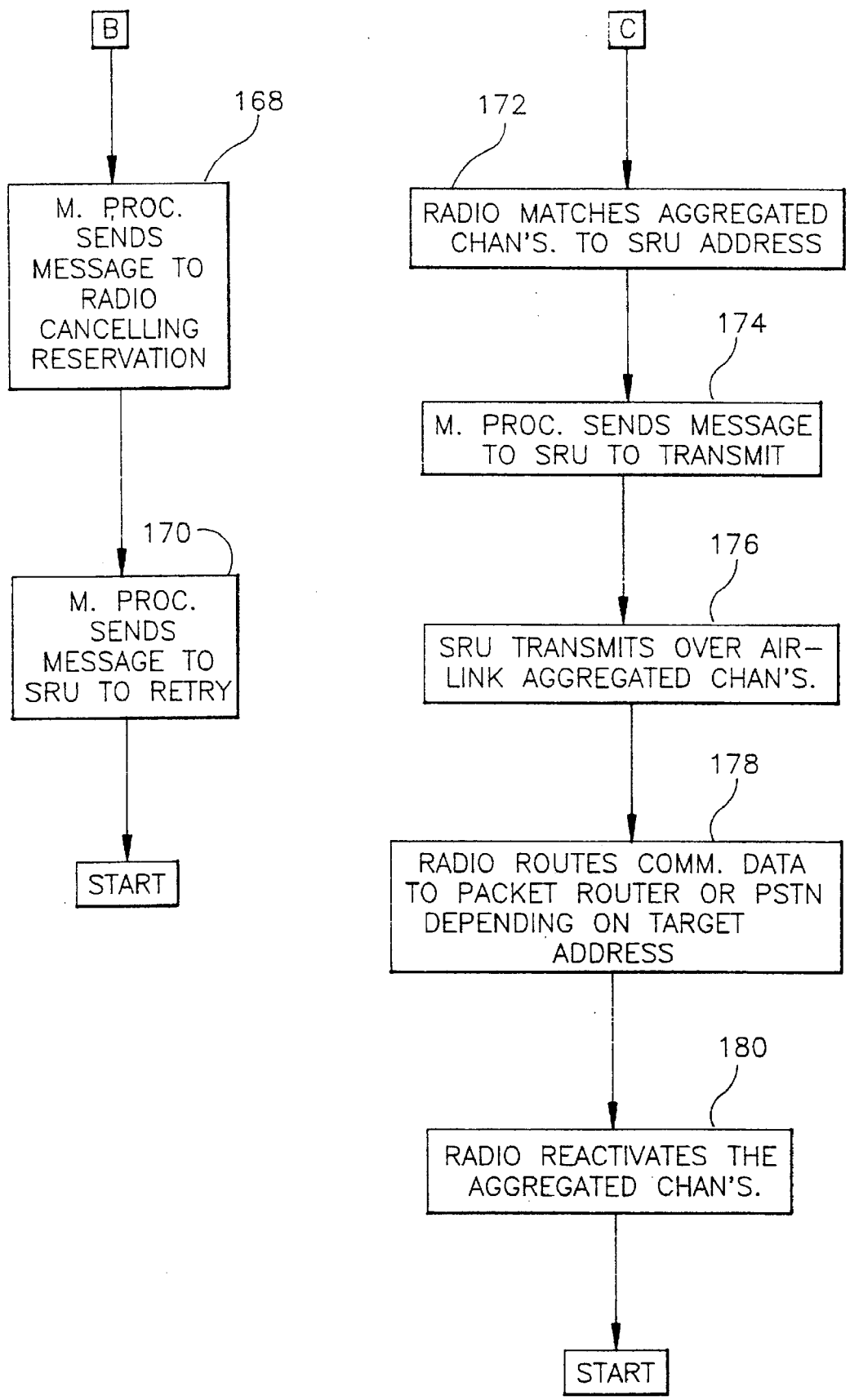
Figure 3A:
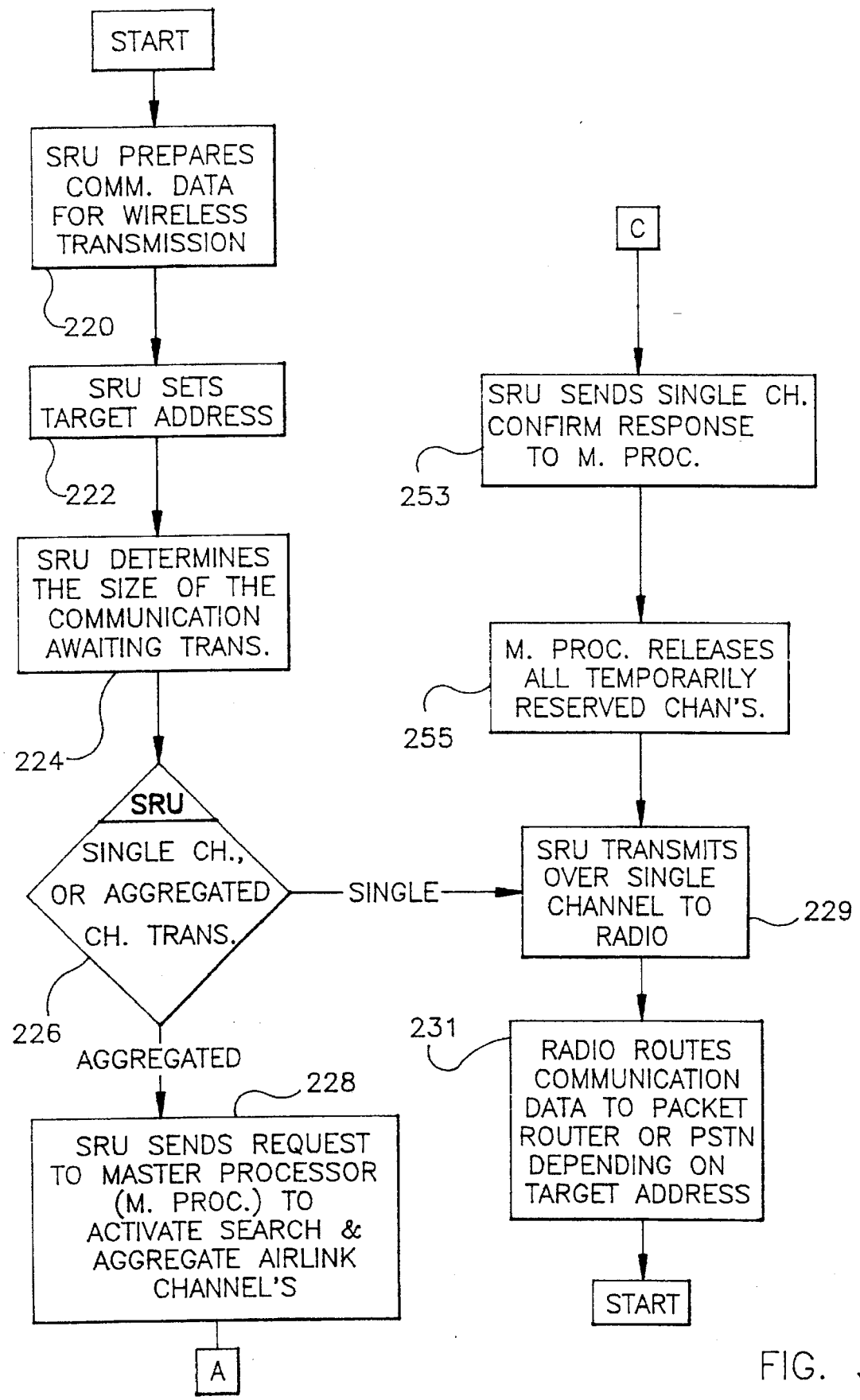
FIGS. 3a–3d are flow diagrams illustrating the operation of the SRU, transceiver, channel radio and master microprocessor according to another embodiment of the instant invention.
Figure 3B:
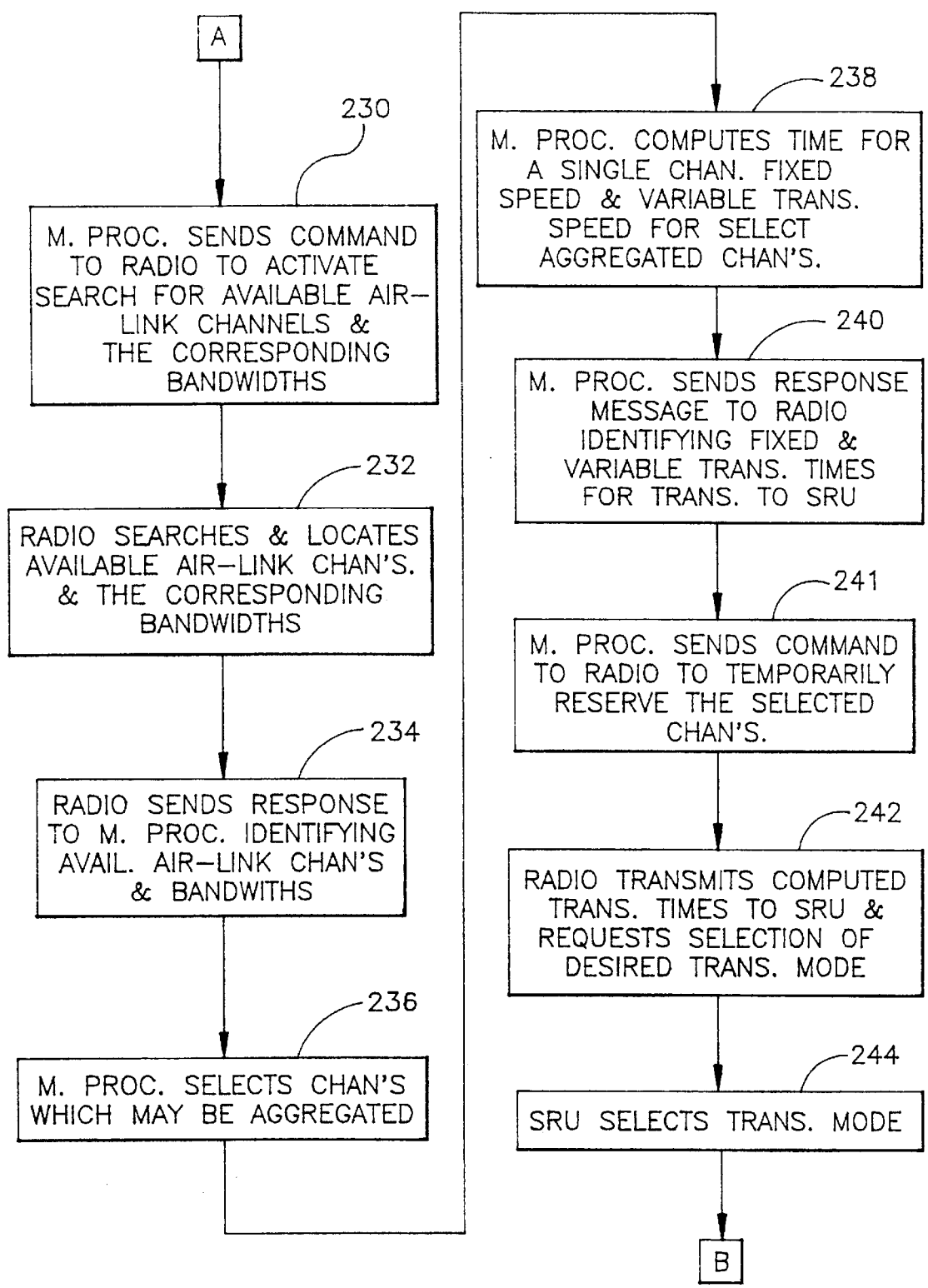
Figure 3C:
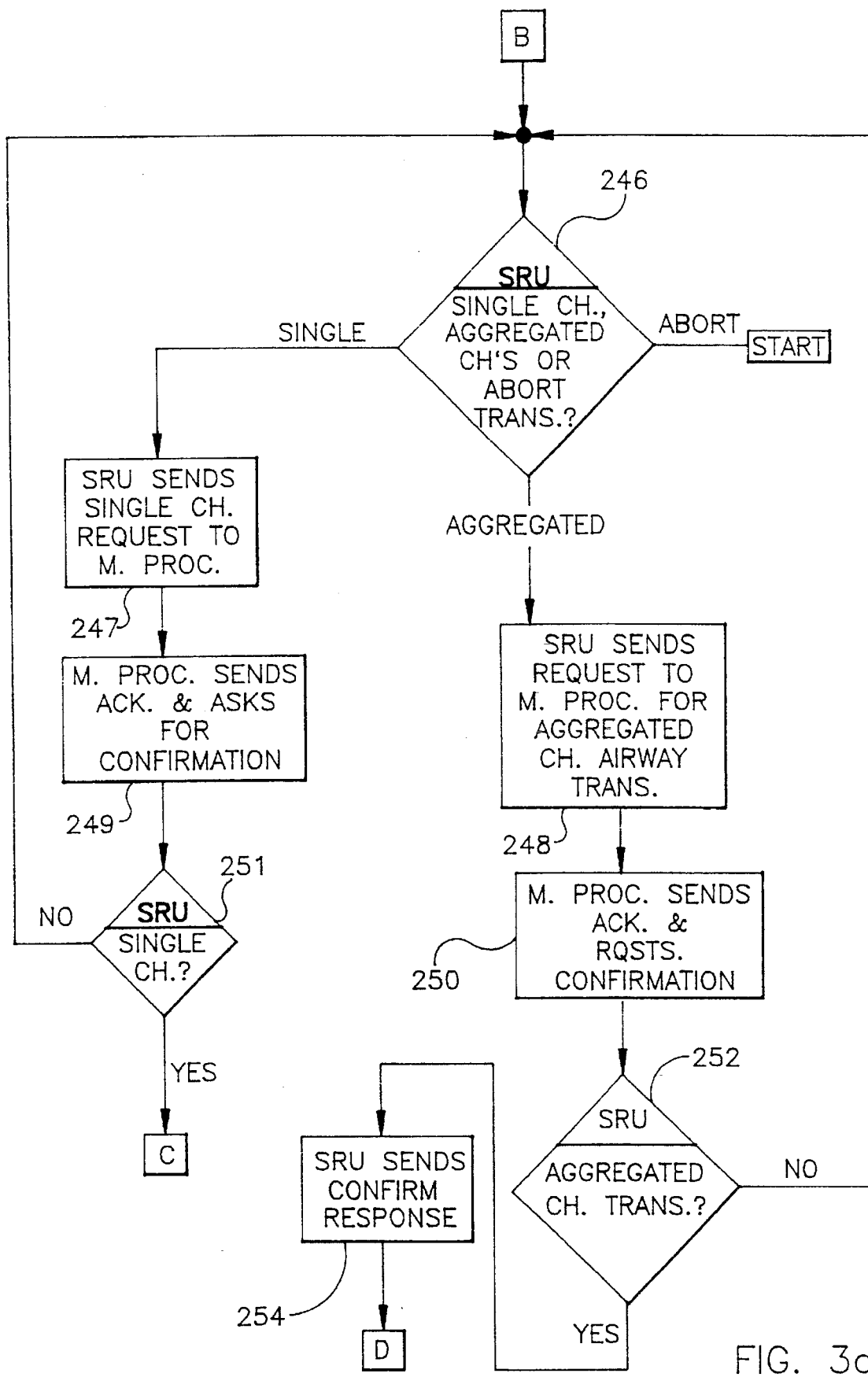
Figure 3D:
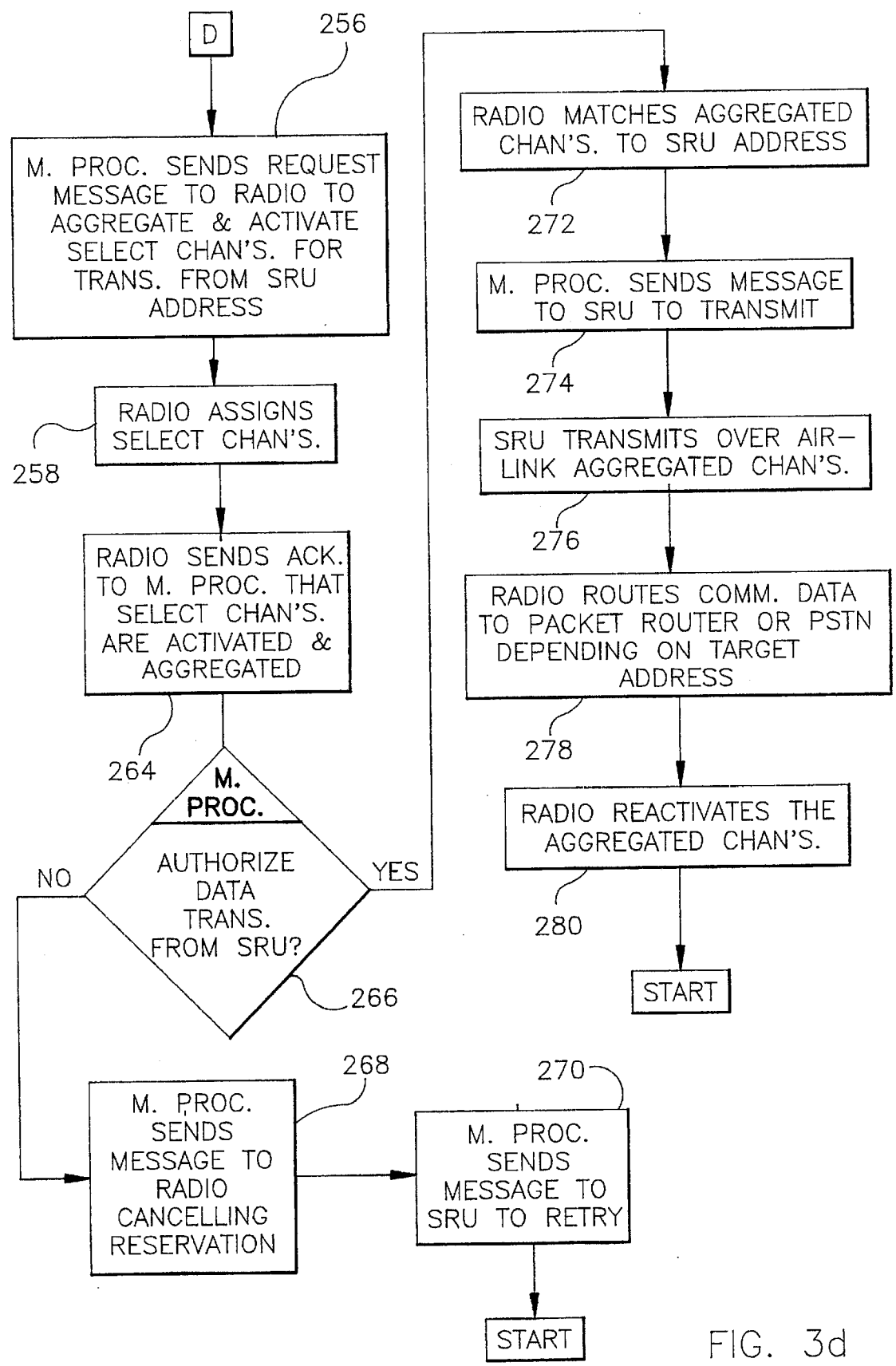
Figure 4A:
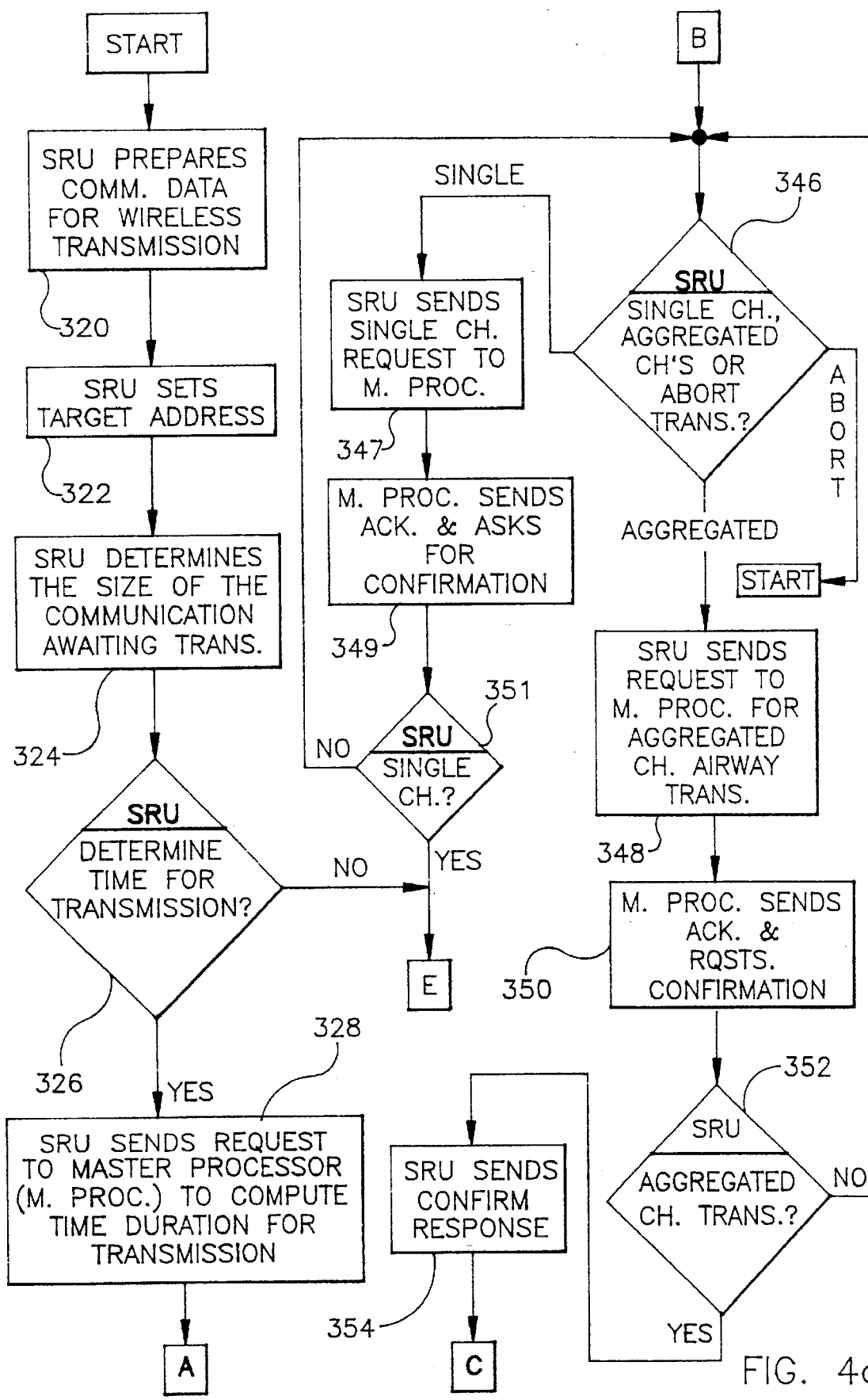
FIGS. 4a–4d are flow diagrams illustrating the operation of the SRU, transceiver, channel radio and master microprocessor according to an alternate embodiment of the instant invention.
Figure 4B:
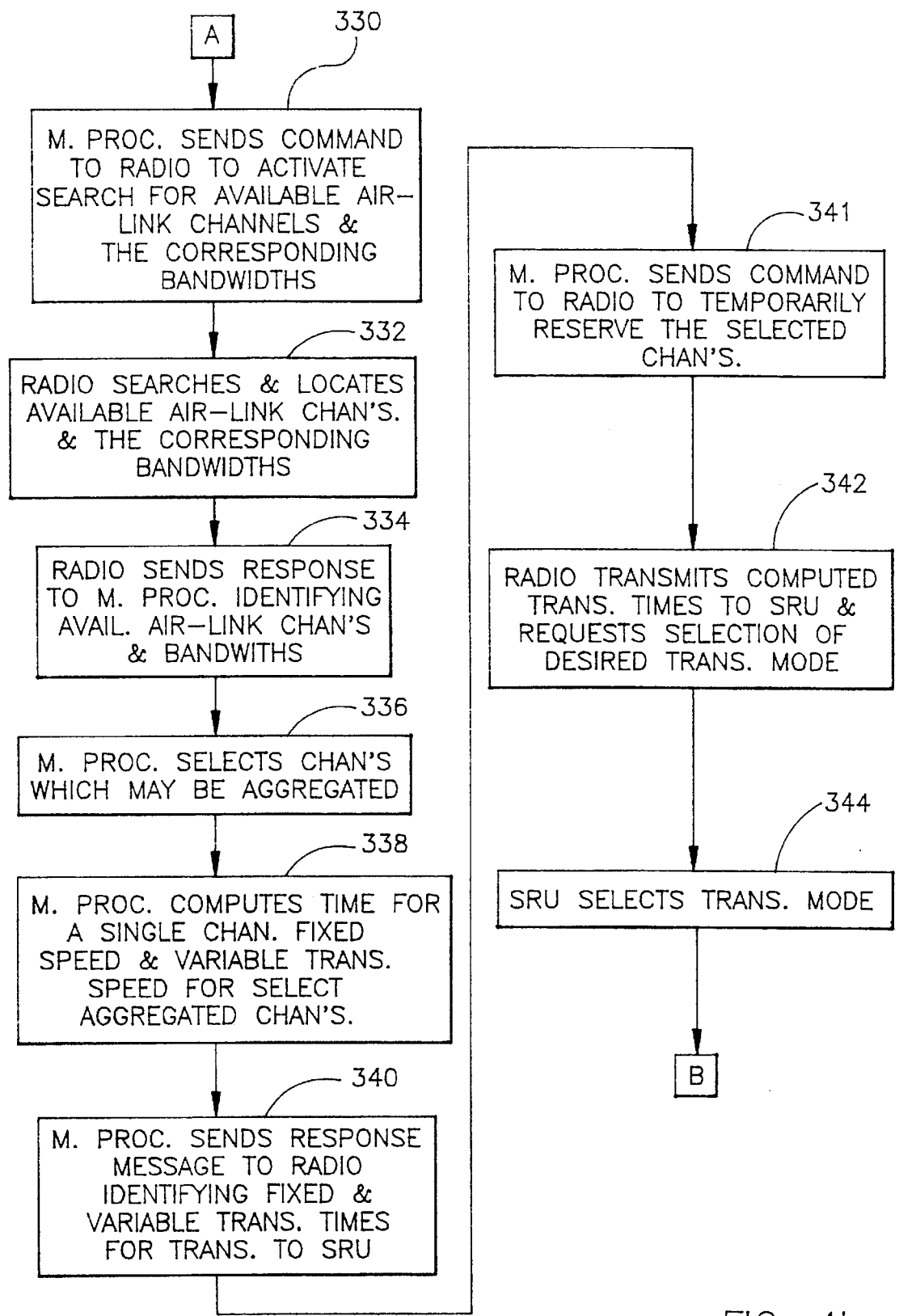
Figure 4C:
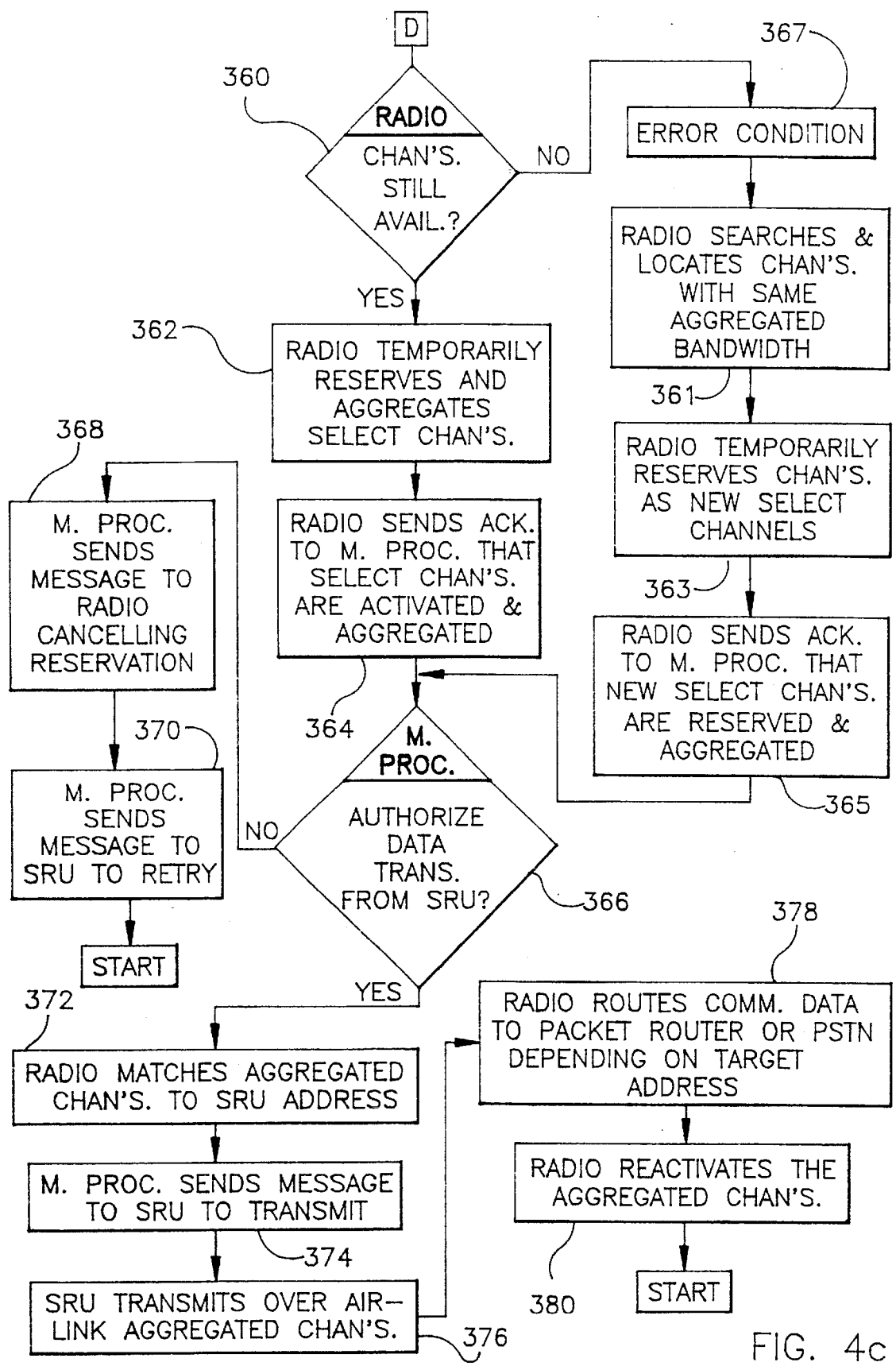
Figure 4D:
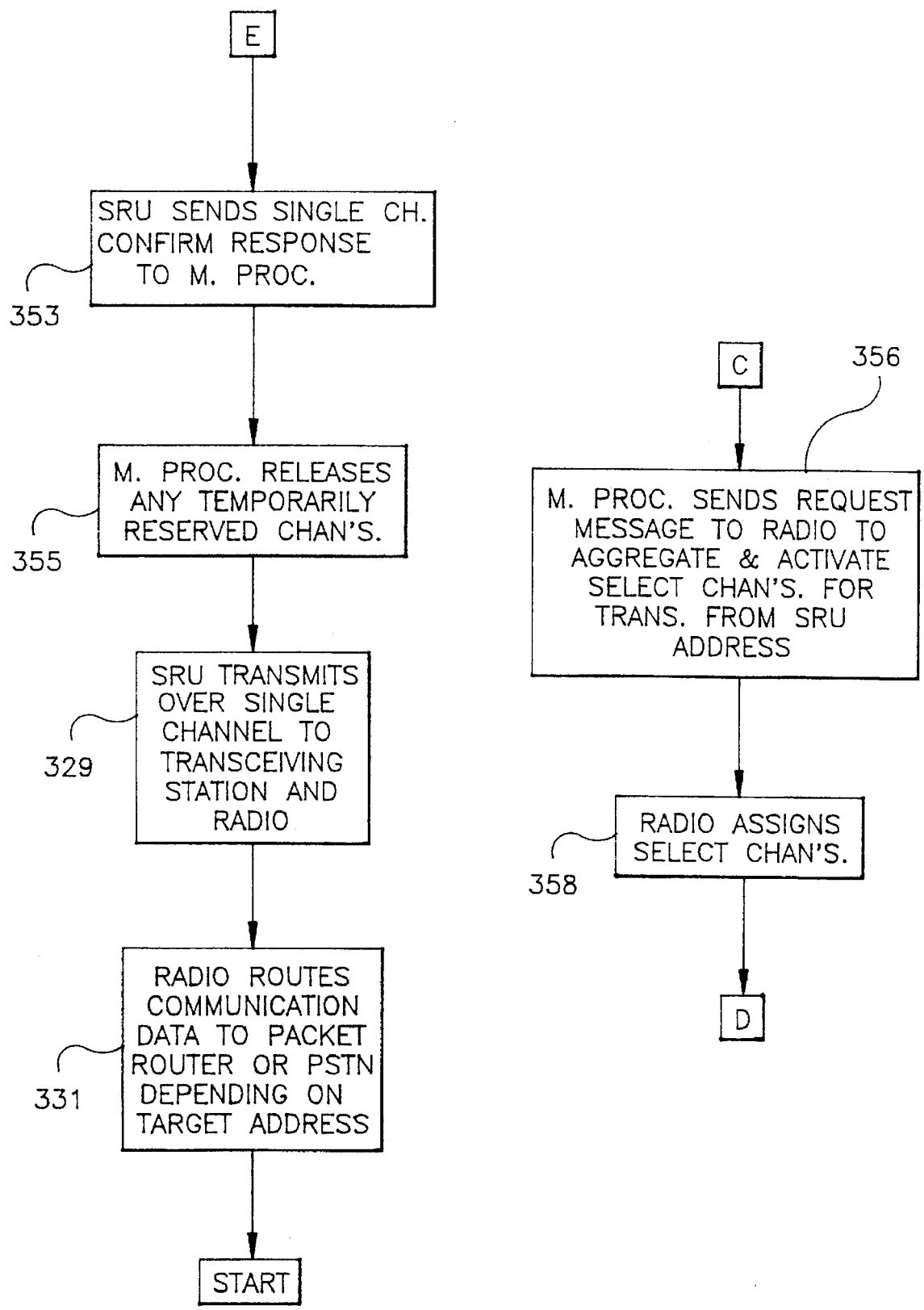

With reference to FIGS. 2a–2c, shown is a method for locating and aggregating available air-link channels 110 so as to increase the overall bandwidth for wireless transmissions. To aggregate air-link channels 110, the SRU 101 prepares the communication data or message for transmission, see block 120, across the air-link channels 110 to the transceiving station 102. The SRU 101 first sets the target address 122 of the target device, in this case one or more of the terminals 108a–d, to which the communication is being sent. The SRU 101 then determines the size of the communication awaiting transmission 124 as comprised in the steps shown in the flow chart of FIG. 2. After the SRU 101 prepares and determines the size of the message to be transmitted, the user decides whether to aggregate available air-link channels 110, as seen in decision block 126. In the abbreviated method, as shown in FIGS. 2a–2c, the user sends a message command to the master processor 105 to aggregate available radio channels, see block 128, if aggregation is desired and the processor 105 sends an acknowledgment (ACK) of receipt of the demand. The processor 105 then sends a command to the channel radio 103 to locate, allocate and aggregate the available channels, block 130. The radio 103 in response searches, locates and temporarily reserves channels for aggregation, as selected by the master microprocessor 105. A confirming message is sent to the processor 105 after the channels are allocated identifying the available air-link channels and their corresponding bandwidths, as seen in blocks 134 and 136. The processor 105 in turn sends a confirmation of aggregation to the SRU 101, block 143. The SRU 101 then either confirms the desire to transmit over aggregated channels or aborts the transmission, as seen in block 152. If aborting then the SRU 101 or end-user is reset.

When the SRU 101 confirms the aggregation and transmission it converts the message from digital to analog through a digital to analog convertor (D/A) since the airways transmit analog to analog. The message is transmitted in segments or chunks and initially received by the transceiver 102. Once the transceiving station 102 receives the transmitted message it conveys the message to the radio which is directly linked by cable or wire to the transceiving station 102. The channelized radio 103 then routes the message to either the packet router transfer network 104 or PSTN transfer switch circuit 107, which is directly linked to the radio 103. Before the channel radio 103 sends the message as received to the transfer network it may reassemble the message and digitizes the message into digital segments with a signal processor. The reassembly of the message, however, may be preformed by any signal processor or component after the wireless transmission is completed. Modems provide connection interfaces between each of the communication ports on the packet router 104, radio 103, processor 105 and PSTN 107 for allowing communication between the directly linked devices. The modems typically may include the A/D convertors for digital transmission. Thus, the radio may include an A/D converter to convert the messages to digital before sending it to the transfer network. However, the A/D converter may be located at any desired junction, e.g. at the packet router 104, in the radio 103, or at the transceiver 102. If the transfer network comprises the packet router 104 then the packet router will organize the message segments in packets and route it through select packets, to a server or modem and then to the target address as discussed above. The actual time it will take to send the actual message may be determined by the user before aggregating as shown in FIGS. 3a–3d and 4a–4d. If the user decides not to have the projected transmission time computed a conventional transmission is undertaken whereby the message is transmitted over a single channel to the transceiving station 102 and radio 103 for routing to the target as noted above.

With reference to either FIGS. 3c–3d or FIGS. 4a–4d, for larger messages, the user may desire a computation of the time necessary for transmission, given the fact that air time can be expensive. This represents an alternative function of the instant invention since an actual computation of transmission time is not necessary before aggregating available channels. The present invention teaches two methods for aggregating channels and computing the transmission time as shown in FIGS. 3a–3d and 4a–4d. With respect to FIGS. 3a–3d, and 4a–4d, the user decides whether to transmit over a single or aggregated channel, see block 226. In the method of FIGS. 3a–3d, it is done without computing estimated transmission time but in the method shown in FIGS. 4a–4d the user is preempted as to whether to determine transmission time. As seen in FIG. 4, if transmission time computation is not selected, shown in block 326, then SRU 101 sends a message in a single channel transmission to the processor 105 and transmits over the received channel. See blocks 326, 353, 355, 329 and 331. With reference to FIGS. 3a–3d, the user decides whether to transmit over a single channel or aggregated channels after receiving the transmission time. See blocks 224 and 226. If single is selected, then the SRU 101 activates the radio 103 for single channel transmission and transmits the message over a single channel as conventionally known. See blocks 253, 255, 229 and 231. If an aggregation is selected, the SRU 101 sends the request to the master microprocessor 105 to activate the search and aggregation of air-link communication channels 228. The master processor 105 complies and sends a command to the radio to activate the search for available air-link channels and the corresponding bandwidths. See block 230. The radio 103 in response to the master microprocessor 105 searches and locates available air-link channels and reserves those channels while waiting for response from the master microprocessor 105 after it sends the master microprocessor 105 information regarding the available channels and the corresponding bandwidths. See blocks 232 and 234. Subsequently, the master microprocessor 105 selects those channels which may be aggregated, computes the times for single channel transmission and variable transmission speed for the selected aggregated channels, as shown in blocks 236 and 238. In this method of the invention, the master microprocessor 105 gives the end-user an opportunity to reselect the mode of transmission based on the estimated transmission times over fixed and variable channels. Accordingly, the microprocessor 105 sends a response message to the radio 103 identifying the fixed and variable transmission times for transmission to the end-user, SRU 101, and also commands the channel radio 103 temporarily reserve the selected channels for aggregation. See blocks 240 and 241. The channelized radio 103 then transmits the computed transmission times to the SRU 101 and requests a selection of a desired transmission mode which triggers the SRU 101, or end-user to reconfirm the transmission mode. See blocks 242 and 244. The end-user, or SRU 101, then decides between the aggregated channel transmission, single channel transmission or whether to abort the transmission entirely, as shown in decision block 246. If the transmission is aborted then the SRU 101 informs the master microprocessor 105 and both the microprocessor of the SRU and the master microprocessor 105 reset their controlling software placing the procedure back at the start position.

If, however, the SRU 101 user, or end-user, decides to transmit over a single channel based on the estimated transmission time computed, then the SRU sends a single channel request to the master microprocessor 105 to reconfigure the transmission for single channel transmission. See block 247. The master microprocessor 105 after each received response sends a hand-shaking ACK and ask for confirmation from the end-user to confirm the request. See block 249. This is nothing more than a error protection procedure whereby, if any error occurs the SRU would respond, as in block 251, that the single channel transmission request was incorrect and it would loop back to the decision block 246 where the opportunity would once again exist for selecting single or multiple aggregated channel transmission. However, if the single channel option was correctly selected then the end-user confirms this selection to the master microprocessor 105 which releases all temporarily reserved channels and allows the SRU 101 to transfer over a single channel to the radio as conventionally known. Returning to the block 246, if the aggregated channel transmission is the correct option desired then it is confirmed and the SRU 101 sends the request to the master microprocessor 105 to aggregate the available reserved air-link channels for the wireless transmission. See block 248. Again, the master microprocessor 105 sends an ACK and request confirmation from the end-user. This again is an error protection procedure and the SRU 101 is given the opportunity to correct a wrong selection, as seen in blocks 250 and 252. If the selection for aggregated channel transmission was incorrect then the software loops back to the decision block 246. However, if a aggregated transmission was the correct option then the SRU 101 sends a confirmation response to the master microprocessor, as seen in block 254.

Subsequently, the master microprocessor sends the request message to the channel radio 103 to aggregate and activate the selected reserved air-link channels for a wireless transmission from the end-user, or SRU 101 address. See block 256. The channel radio 103 assigns the selected channels and sends an acknowledgment to the master microprocessor 105 that the selected reserved air-link channels have been activated and aggregated, a seen in blocks 258 and 264. At this point, the master microprocessor 105 goes through another error detection procedure verifying that a successful transmission will occur. If an error is detected, the master microprocessor 105 sends a message to the radio 103 to cancel the reservation of the reserved air-link channels and sends a message to the end-user, or SRU 101, to retry the wireless transmission. See blocks 266, 268, and 270. Consequently, the method returns to the start position. However, if the master microprocessor detects no errors then the channelized radio 103 establishes a communication link with the end-user or SRU 101 address and sends a confirmation that transmission is ready to the master microprocessor. The master microprocessor 105 then sends a message to the end-user or SRU 101 to transmit the message. The SRU 101 then transmits over the aggregated air-link channels 110 and the radio 103 routes that message to the external transfer network, that is either a packet router 104 or PSTN 107 depending on the target address. See blocks 272–280. After the transmission is complete, the channel radio 103 reactivates the aggregated channels for later transmissions and the software loops back to the start position to allow future wireless transmissions.

Now with reference to FIGS. 4a–4d, the user at decision block 326 decides whether to compute a transmission time which is different from the previous message which has the user decide first whether to transmit over a single or aggregated channel. Accordingly, this method is procedurally different from the previous method discussed and allows the end-user to transmit over a single channel by deciding not to compute the transmission time, or to compute the transmission time and then afterwards select the desired transmission mode, that is single channel, aggregated channel or aborting the transmission in its entirety. If desired, the end-user selects the option requesting message transmission time computation causing the SRU 101 to send a message request to the master microprocessor 105 to estimate the time duration for projected message transmission as seen in blocks 326–342 of FIGS. 4a–4b. The processor 105 sends an ACK back to the SRU 101, or end-user, upon receiving the request. All communications with the processor 105 and the SRU 101 pass through the channelized radio 103 which is directly linked to the transceiver station 102 for transmitting between the SRU 101 and transceiver station 102 as shown in FIG. 1. In addition in all communication, discussed herein, transactions between each devices 101–107 is verified by a handshake, i.e. ACK transmittals, formally notifying the units that communication of demand or request was received.

To begin the aggregation computation process, as shown in FIGS. 4a–4d, the master microprocessor 105 sends a command to the channelized radio 103 to activate a search for available air-link channels or paths and their corresponding bandwidths. See block 330. The radio 103 searches and locates the available air-link channels 110 and determines the corresponding bandwidth of each available radio channel. See block 332. The radio 103 sends a response to the processor 105 after locating these channels identifying the available air-link channels and bandwidths which may be aggregated. See block 334. Upon receipt of the radio's 103 response, the processor 105 selects the channels which may be aggregated to adequately transmit the message from the SRU 101, or transmission 102, across the air-links in a reasonable amount of time. See block 336. The channels selected or the number thereof is based on the management of communication networks within the communication cloud or radio's range, the capacity of the network and the present loads. A second cloud may communicate with another cloud by linking with another packet router network such as 104a and 104b. Accordingly, the distance and number of routers involved in the transmission are taken into account in the estimation. The processor 105 computes the time for a transmission of the requisite communication across a single channel which is a fixed speed and the variable transmission speed for transmitting the message across select aggregated channels. See block 338. The aggregated channel transmission is termed a variable transmission speed because it depends on the number of available channels which may be aggregated. Likewise, transmission across a single channel is considered fixed because the speed of transmission across the channel is directly related to the size of the channel's bandwidth.

After computing the fixed and variable transmission speeds, the processor 105 sends a response message back to the SRU 101, through the radio 103 and transceiving tower 102 identifying the fixed and variable transmission times for the message of interest. The processor 105 also request the radio 103 to reserve the identified and selected channels for aggregation. See blocks 340 and 341. The user then receives and selects the desired transmission mode, i.e. fixed or variable, from their SRU 101 option or function keys 101b based on the computed times. The options available for the user on the SRU 101 include whether to transmit across a single channel, aggregated channels or whether to abort the transmission completely, as shown in blocks 346–353 in FIG. 4a. If the transmission is aborted, no transmission will occur and the process begins from the start position. If the user selects a transmission across a single channel, the SRU sends a single channel request to the processor 105. The processor 105 acknowledges receipt of this request and may ask for confirmation from the user or SRU 101 before authorizing transmission. This is to insure that the user has correctly selected the desired option. If the wrong transmission mode was requested the user responds in the negative and the program is looped back up to the transmission selection mode at input to block 346. If the single channel transmission was the correct request, the user enters yes, causing the SRU 101 to send an affirmative confirmation in response to the processor 105. The processor 105 then sends a command to the radio 103 authorizing transmission across a single channel thereby negating any aggregation for that transmission and freeing up the previously reserved channels except for one. See block 353 and 355. The user then triggers the SRU 101 which transmits the communication or message over a single channel to the receiving station 102 and radio 103. The radio 103 routes the communication data to the packet router 104 or PSTN 107, depending on the target address, which sends the message to the ultimate target address 108, 108a or 108b through either modems, servers or both. It should be noted that the packet router 104 could comprise a mesh of individual packet routers 104a, or 104b as shown in FIG. 1 which directly communicate with each other. The route of the transmission through the packet router system is unimportant for this discussion since it is a function merely controlled by the packet router's own management system which routes according to and based on its capacity and load.

To send a message from the SRU 101 across aggregated air-link communication channels the user selects that operation from the SRU 101, i.e. blocks 346–348. The SRU 101 sends the aggregated channel airway transmission message request to the master microprocessor 105 by way of the transceiver 102 and the radio 103. The processor 105 sends an ACK and requests a confirmation from the SRU 101 that the correct transmission mode has been selected. See block 350 and 352. If the aggregated channel transmission mode is not the desired mode the user enters "no" causing the software to loop back to the transmission mode select option at the input to block 346. If the aggregated channel transmission mode is the correct or desired transmission selection an affirmative response is sent back to the processor 105 confirming an air-link channel aggregation transmission, as seen in block 354.

With reference to blocks 356 and 358, after receiving the confirmation of an aggregated channel transmission, the processor 104 sends a command message to the radio 103 to aggregate and activate the previously reserved and selected radio channels for transmission of the message from the SRU 101 address to its ultimate target address. The radio 103 then activates the selected channels for the air-link transmission. If the end-user had the transmission time computed then the reserved and selected channels from which the computation was based are assigned and initialized for transmitting.

In an alternative embodiment, as shown in blocks 360–365, the radio 103 relocates and checks the once selected air-link channels for availability. This represents a difference in steps from the sequence of steps shown in FIGS. 3a–3d. Sometimes the selected channels may not be reserved by error or so as to not congest the airway, or as previously discussed the select channels are only temporarily reserved and may be reactivated after a period of time. Therefore, if too much time or a predetermined amount time passes without authorization from the end-user, or SRU 101, to aggregate select channels and proceed with transmission then the channels are freed. If the channels are still available then they are automatically activated and allocated to the corresponding SRU 101. If not, the radio 103 searches and locates channels which are available and which would provide the same aggregated bandwidth as the originally selected channels. The radio 108 then temporarily reserves these channels as new selected channels and sends an acknowledgment to the processor that new select channels have been reserved and aggregated for the transmission of the message from the SRU 101. If the originally selected channels are still available the radio 103 temporarily reserves and aggregates these selected channels. The radio 103 then sends an acknowledgment to the processor 105 informing the processor 105 that the selected channels have been activated and aggregated for the overall desired bandwidth. See block 364. The processor 105 then authorizes the data transmission from the SRU 101 across the aggregated channels and checks for error conditions. See block 366. If no problems are present for the transmission from the originating SRU 101 to the target address, the data transmission from the SRU 101 is authorized. If the processor 105 does not authorize the transmission it sends a message to the radio 103 cancelling the reservation of the aggregated channels and then sends a message to the SRU 101 to retry the transmission from the start position, as seen in blocks 366, 368 and 370. With reference to blocks 366 and 372–380, if the processor 105 authorizes the data transmission, the processor 105 sends a confirmation to the SRU 101. The SRU 101 then transmits the desired message over the air-link aggregated channels to the transceiving station 102. The wireless transmission from the SRU 101 to the transceiver 102 is an A/A transmission. Once the message is received, an A/D converter converts the message to digital, but this conversion may take place at either the transceiver station 102, the radio, the packet router 104 or PSTN, or anywhere therebetween. Since the transceiving station is directly wired or linked to the radio 103 any necessary aggregation of paths would have already been obtained. The radio 103 routes the communication to either the packet router 104 or PSTN 107 depending on the target address. Beforehand, however, the message is typically reassembled since most transmission are segmented into chunks. If the selected aggregated channels are adjacent in the frequency spectrum then segmenting the message may not be necessary. The packet router 104 after receiving the message routes it through its packets and eventually to target server. The server 106 then sends it to either the target terminal address or the LAN. The LAN, as previously discussed, is a network consisting of a local group of computers such as those found in private companies which are interconnected. Once the radio 103 has routed the communication to its target address, the radio reactivates the selected channels making them available once again for a subsequent transmission.

It is important to note that a transmission may be initiated by a terminal address 108a–d for sending a message to an SRU 101. In such a case, the terminal acting as an originating address would communicate with the master processor in the same way with the same options. That is, the same methods discussed herein are available for a terminal 108 end-user, except that, the SRU 101 becomes the target and decisions once made by the SRU 101 end-user are made by the terminal end-user 108. The terminal end-user would select an SRU target address, request aggregation, reserve channels and transmit. The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A wireless bandwidth air-link system for varying the overall bandwidth of air-link communication channels to increase the speed of wireless message transmission, said system comprising:

means for locating and aggregating available air-link communication channels so as to increase the air-link bandwidth for wireless transmission of messages to and from a mobile communication subscriber unit;

means for controlling said locating and aggregating means in communication with said locating and aggregating means, said controlling means enabling and regulating said locating and aggregating means in searching and combining available air-link communication channels, said controlling means receiving request to aggregate air-link communication channels; and means for communicating with the mobile communication subscriber unit, said communicating means providing a communication link between the mobile communication subscriber unit and said locating and aggregating means for receiving and transmitting messages across the air-link channels to and from the mobile communication subscriber unit.

2. A system as recited in claim 1, wherein said means for controlling comprises a first microprocessor electrically connected to said means for locating and aggregating for sending control signals to and receiving response signals from said means for locating and aggregating.

3. A system as recited in claim 2, wherein said first microprocessor further comprises means for initializing said means for locating and aggregating so as to cause said means for locating and aggregating to begin locating available air-link communication channels.

4. A system as recited in claim 3, wherein said first microprocessor further comprises means for selecting the airway communication channels to be aggregated by said means for locating and aggregating so as to provide a time efficient transmission across the communication air-links to and from the mobile communication subscriber unit.

5. A system as recited in claim 2, wherein said means for locating and aggregating comprises a channelized radio electrically connected between said means for communicating and said first microprocessor, said channelized radio for locating and aggregating available airway communication channels at the control and demands of said first microprocessor when requested by the mobile communication subscriber unit.

6. A system as recited in claim 5, further comprising an external information transfer network for routing messages transmitted between the mobile communication subscriber unit and a fixed communication unit wherein the mobile communication subscriber unit and the fixed communication unit communicate through said means for communicating, said information transfer network being electrically connected to said channelized radio and said first microprocessor.

7. A system as recited in claim 6, further comprising a signal processor electrically associated with said channelized radio for converting messages into a demodulated form for sending over direct links to the fixed communication unit and for modulating signals received for transmitting over air-link communication channels to the mobile communication subscriber unit.

8. A system as recited in claim 1, wherein said means for locating and aggregating further comprises a means for reserving available air-link communication channels which have been located so as to not lose the available air-link communication channels before aggregating.

9. A system as recited in claim 1, wherein said means for communicating comprises a transceiver electrically connected to said means for locating and aggregating available air-link communication channels, said transceiver for receiving and transmitting wireless messages between the mobile communication subscriber unit and said means for locating and aggregating.

10. A system as recited in claim 9, wherein said system further comprises:

a second microprocessor electrically connected to the mobile communication subscriber unit for processing messages and demands for increasing available airway communication channel bandwidth; and a second transceiver electrically connected to the mobile communication subscriber unit for receiving and transmitting wireless messages.

11. A system as recited in claim 1, wherein said means for locating and aggregating available air-link communication channels comprises a channelized radio electrically connected to said means for communicating and said means for controlling.

12. A method for increasing the bandwidth of air-link communication channels for the wireless transmission of messages to and from mobile end-user communication subscriber units, said method comprising the steps of:

(a) transmitting a demand from an originating end-user communication device to a microprocessor for an increase in the bandwidth of air-link communication channels for wireless transmission of a message to a target end-user communication device;

(b) activating a wireless radio transmitting means from the microprocessor based on code generated in response to the demand for an increase in bandwidth;

(c) searching for available air-link communication channels with the wireless radio transmitting means;

(d) sending a response from the wireless radio transmitting means to the microprocessor identifying available air-link communication channels located;

(e) selecting with the microprocessor available air-link communication channels to be aggregated based on the available air-link communication channels identified in the response from the wireless radio transmitting means; and (f) aggregating selected air-link communication channels at the wireless radio transmitting means to increase the overall bandwidth for wireless transmission to an end-user communicating device.

13. A method as recited in claim 12, further comprising the step of reserving available air-link communication channels located in the search before sending a response to the microprocessor identifying the available air-link communication channels.

14. A method as recited in claim 13, further comprising the step of sending a confirmation to the originating end-user communication device after reserving available air-link communication channels that available air-link communication channels have been reserved for aggregation; and transmitting a confirmation from the originating end-user communicating device to aggregate the reserved available air-link communication channels.

15. A method as recited in claim 14, further comprising the step of providing the microprocessor with the individual bandwidths of available air-link communication channels located when sending the response to the microprocessor identifying the available air-link communication channels located.

16. A method as recited in claim 15, further comprising the step of computing the estimated time duration for transmission of a message from the originating end-user communication device to the target end-user.

17. A method as recited in claim 16, further comprising the step of performing an error detection procedure after aggregating selected air-link communication channels to determine that a successful wireless transmission may be performed from the originating end-user communication device to the target end-user communication device.

18. A wireless variable bandwidth air-link communication system for varying the bandwidth of available air-link communication channels, said system comprising:

a microprocessor encoded for initiating the search and aggregation of available air-link channels;

a channelized communication radio directly linked to said microprocessor for receiving commands from said microprocessor to search, locate and aggregate available air-link communication channels for the wireless transmission of a message from an originating end-user communication device;

means for aggregating available air-link channels defined by said channelized radio;

a transceiving device directly linked to said means for aggregating available channels for transmitting signals from said means for aggregating air-link communication channels to locate and aggregate air-link channels; and means for communicating said microprocessor with the originating end-user communication device electrically linked to said microprocessor and said channelized communication radio for allowing the originating end-user communication device to demand an increase in the bandwidth of air-link communication channels.

19. A system as recited in claim 18, wherein said means for communicating comprises:

at least one modem electrically associated with said microprocessor and said channelized communication radio for receiving and sending messages.

20. A system as recited in claim 19, wherein said means for communicating further comprises a signal processor electrically associated with said channelized communication radio for demodulating and modulating messages transmitted from the originating end-user communication device.

* * * * *